(12) United States Patent
Moyerman et al.

(10) Patent No.: US 10,146,980 B2
(45) Date of Patent: Dec. 4, 2018

(54) SPORTS EQUIPMENT MANEUVER DETECTION AND CLASSIFICATION

(71) Applicant: Intel Corporation, Santa Clara, CA (US)

(72) Inventors: Stephanie Moyerman, Phoenix, AZ (US); Xue Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 14/952,031

(22) Filed: Nov. 25, 2015

(65) Prior Publication Data
US 2017/0144023 A1 May 25, 2017

(51) Int. Cl.
| | |
|---|---|
| *G01P 13/00* | (2006.01) |
| *G06K 9/00* | (2006.01) |
| *A63C 17/00* | (2006.01) |
| *G06K 9/62* | (2006.01) |

(52) U.S. Cl.
CPC ............... *G06K 9/00* (2013.01); *A63C 17/00* (2013.01); *G06K 9/6276* (2013.01)

(58) Field of Classification Search
CPC . G06K 9/00342; G01P 15/00; A63B 24/0062; A63B 2024/0071
USPC ...................................... 463/19–43
See application file for complete search history.

(56) References Cited

U.S. PATENT DOCUMENTS

| | | | | |
|---|---|---|---|---|
| 2002/0116147 A1* | 8/2002 | Vock | ............... | A63C 5/06 702/182 |
| 2007/0061106 A1* | 3/2007 | Vock | ............... | G01P 3/50 702/182 |
| 2012/0283016 A1* | 11/2012 | Persaud | ............... | A63F 13/06 463/36 |
| 2013/0085713 A1* | 4/2013 | Rogel | ............... | H04R 1/02 702/141 |
| 2013/0196769 A1 | 8/2013 | Shocklee | | |
| 2013/0267335 A1 | 10/2013 | Boyd et al. | | |
| 2013/0274040 A1* | 10/2013 | Coza | ............... | G09B 19/0038 473/570 |

(Continued)

FOREIGN PATENT DOCUMENTS

WO 2017111933 A1 6/2017

OTHER PUBLICATIONS

International Application No. PCT/US2015/67253, entitled "Monitoring Player Performance," filed Dec. 22, 2015.

(Continued)

*Primary Examiner* — Masud Ahmed
(74) *Attorney, Agent, or Firm* — Schwabe, Williamson & Wyatt, P.C.

(57) ABSTRACT

Embodiments of the present disclosure provide techniques and configurations for an apparatus for identifying a maneuver of sports equipment. In one instance, the apparatus may comprise a housing to be attached to the sports equipment; two or more sensors disposed on or in the housing to sense acceleration or rotation of the sports equipment during the motion of the sports equipment, and to output motion data associated with the acceleration or rotation of the sports equipment; and circuitry disposed in the housing and coupled to the sensors to receive the motion data and to identify a maneuver performed using the sports equipment, based on the motion data. Other embodiments may be described and/or claimed.

20 Claims, 4 Drawing Sheets

(56) References Cited

U.S. PATENT DOCUMENTS

| | | | |
|---|---|---|---|
| 2013/0288812 A1 | 10/2013 | Kato et al. | |
| 2014/0074265 A1* | 3/2014 | Arginsky | A63B 71/0622 |
| | | | 700/91 |
| 2014/0278218 A1* | 9/2014 | Chang | G01P 15/00 |
| | | | 702/150 |
| 2014/0336796 A1* | 11/2014 | Agnew | A43B 3/0005 |
| | | | 700/91 |
| 2015/0005911 A1* | 1/2015 | Lake, II | G06Q 50/22 |
| | | | 700/91 |
| 2015/0057112 A1* | 2/2015 | Sak | A63B 24/0003 |
| | | | 473/461 |
| 2015/0285834 A1 | 10/2015 | Shibuya et al. | |
| 2015/0335949 A1* | 11/2015 | Lokshin | A61B 5/7246 |
| | | | 700/91 |
| 2015/0335978 A1 | 11/2015 | Syed et al. | |
| 2016/0054449 A1* | 2/2016 | Pekonen | G01C 22/006 |
| | | | 342/357.57 |

OTHER PUBLICATIONS

International Search Report and Written Opinion dated Sep. 22, 2016, issued in related International Application No. PCT/US2015/67253, 15 pages.

\* cited by examiner

SPORTS EQUIPMENT MANEUVER DETECTION AND CLASSIFICATION

FIELD

Embodiments of the present disclosure generally relate to the field of sensor devices, and more particularly, to devices configured to detect and identify maneuvers of sports equipment in action sports.

BACKGROUND

Classification of complex motions from captured sensor data may be a complex and computationally costly procedure. While algorithms may exist for quantifying simple user actions, such as step counting, more complex actions still lack accuracy in quantification. In particular, in the realm of action sports, such as skateboarding, snowboarding, surfing, skiing, and the like, few, if any, algorithms exist for classifying and quantifying maneuvers performed by sports participants using appropriate sports equipment, such as skateboards, snowboards, or the like. With the introduction of these sports into the Olympics and other high level competitions, automatic methods for real- or near-real time maneuver classification and scoring has become increasingly important, for example, for judging competitions in action sports.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for an apparatus for detecting and identifying a maneuver of sports equipment. In some instances, the apparatus may comprise a housing to be attached to the sports equipment; two or more sensors disposed on or in the housing to sense acceleration or rotation of the sports equipment during the motion of the sports equipment, and to output motion data associated with the acceleration or rotation of the sports equipment; and circuitry disposed in the housing and coupled to the sensors to receive the motion data and to identify a maneuver performed using the sports equipment, based on the motion data.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
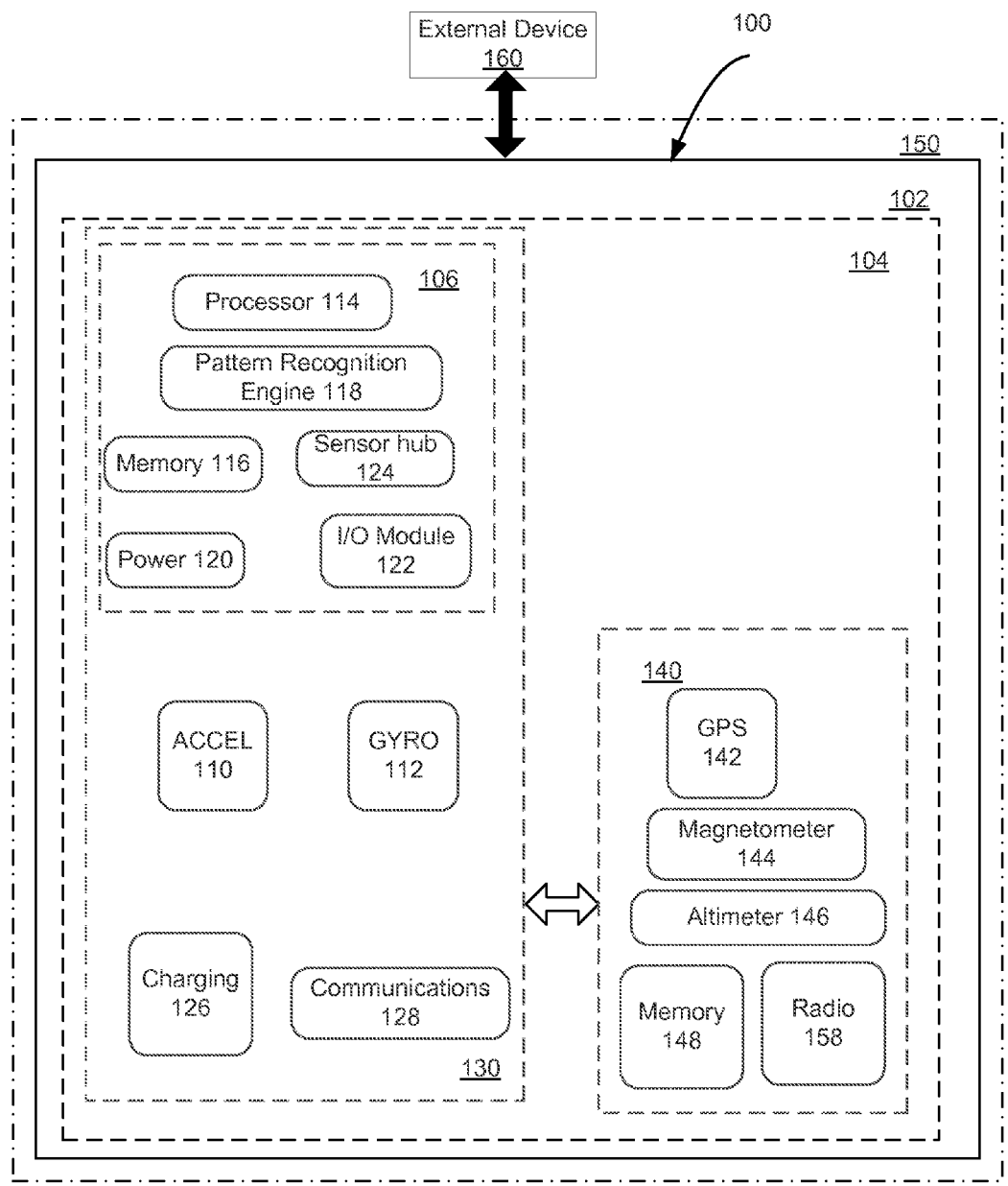
FIG. 1 is a block diagram illustrating an example apparatus for detection and identification of a maneuver performed using sports equipment incorporated with the embodiments of the present disclosure, in accordance with some embodiments.

FIG. 1 is a block diagram illustrating an example apparatus 100 incorporated with the embodiments of the present disclosure, in accordance with some embodiments. The apparatus 100 may be configured to be attachable to sports equipment 150 (schematically shown by a dashed and dotted line). In embodiments, the sports equipment 150 may be used to conduct a motion on or above a surface, such as ground, asphalt, water, snow, or the like. The sports equipment 150 may be operated by a user to propel the user on or above the surface. For example, the sports equipment 150 may include recreational equipment for action sports, such as a snowboard, a skateboard, a surfboard, a ski, a skate, or the like.

The sports equipment 150 may be configured to enable a user to perform various maneuvers, otherwise known as tricks, while the sports equipment 150 is in motion on or above a surface. A maneuver may include a combination of different events of various durations associated with the sports equipment 150. For example, a maneuver may comprise a combination of rotation and/or acceleration of the sports equipment 150 over a period of time (e.g., about 2 seconds for some action sports). For example, in skateboarding, a maneuver may comprise a jump, floating in the air (above the ground), a flip, a spin (e.g., around many different axes), or a combination thereof (e.g., freestyle). There may be different types of maneuvers, with a determined number of maneuver components (e.g., jumps, revolutions, flips, etc.) pertaining to a particular maneuver type. Maneuver performance on sports equipment may require detection, identification, and quantification, for example, in a competition environment. The apparatus 100 provided according to the embodiments described herein may be configured to detect a maneuver and identify a type of the maneuver performed using the sports equipment 150 or, more specifically, performed by a user operating the sports equipment 150.

In embodiments, the apparatus 100 may have a housing 102 configured to be attachable to the sports equipment 150. The housing 102 may house circuitry 104 configured to detect and identify a maneuver performed using sports equipment as described below. The housing 102 may include any shape, form, dimensions and material that may be appropriate for mounting on particular sports equipment. In general, the housing 102 may be provided as an enclosed space to house the circuitry 104.

The apparatus 100 may further include two or more sensors 110, 112 disposed on or in the housing 102 and coupled with the circuitry 104. In some embodiments, the sensors 110, 112 may be embedded in the circuitry 104. The sensors 110, 112 may be configured to sense acceleration or rotation of the sports equipment 150 during the motion, and to output motion data associated with the acceleration or rotation of the sports equipment 150. In embodiments, sensors 110 and 112 may comprise an accelerometer and a gyroscope respectively. While two sensors to sense acceleration or rotation of the sports equipment are shown in FIG. 1, multiple accelerometers and/or gyroscopes may be used to provide a desired quality of motion data.

Figure 2:
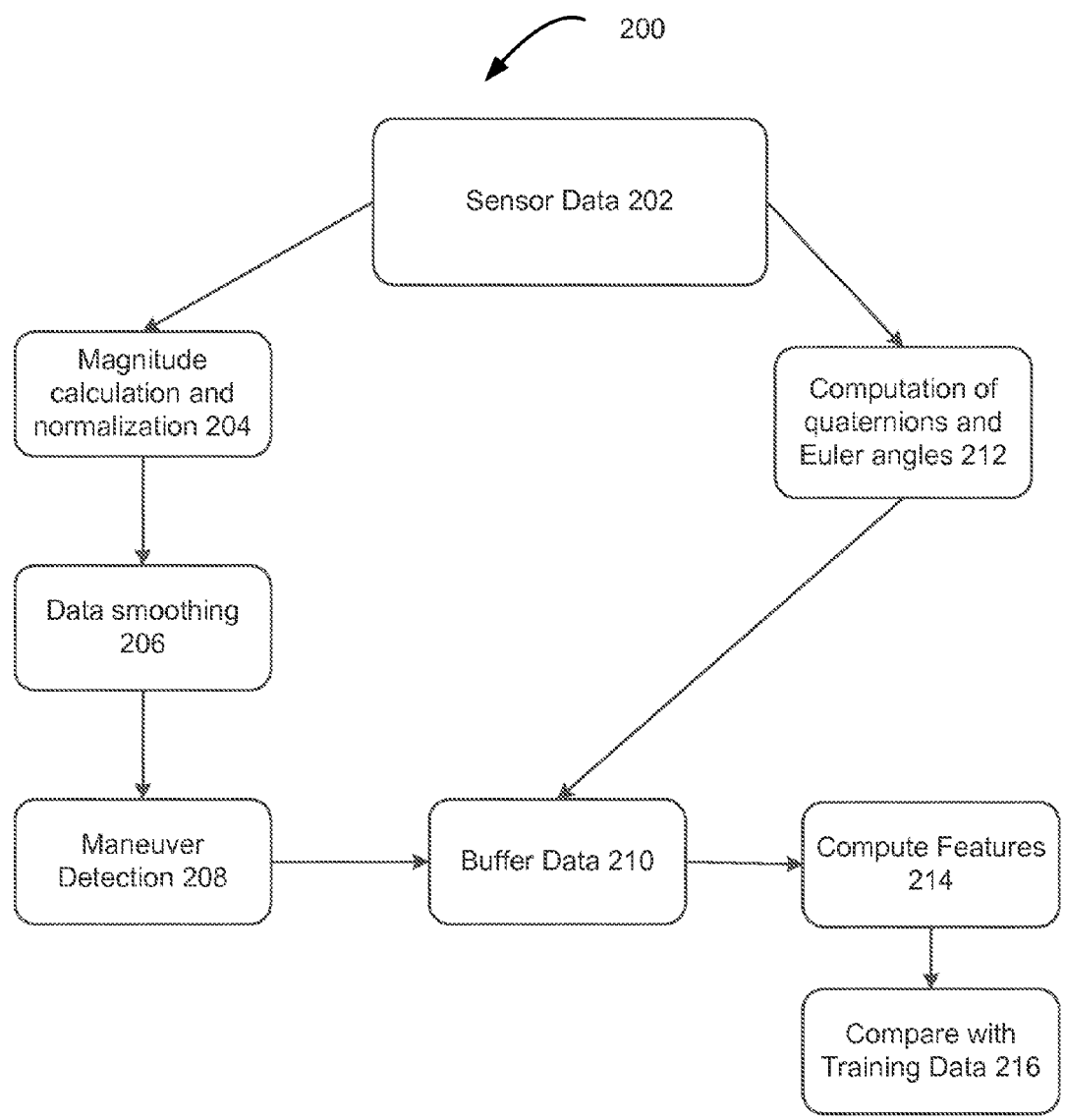
FIG. 2 is an example block diagram illustrating detection and identification of a maneuver performed using sports equipment, in accordance with some embodiments.

The circuitry 104 may be configured to receive the motion data from the sensors 110, 112 and to detect and identify a maneuver performed using the sports equipment 150, based on the motion data, as described in greater detail in reference to FIG. 2. For purposes of detection and identification of a maneuver, the circuitry 104 may include a processing unit 106. The processing unit 106 may include a processor 114 and memory 116 (e.g., flash memory). The processor 114 may be implemented as having multi-cores, e.g., a multi-core microprocessor. The memory 116 may have instructions that, when executed on the processor 114, may cause the processor 114 to perform tasks of the apparatus 100, some of which are described below in reference to FIGS. 2 and 4. The instructions on execution by processor 114 may implement a pattern recognition engine 118 to identify the maneuver performed using the sports equipment 150. For example, the executed instructions may compute one or more rotation and acceleration features from the motion data provided by the sensors 110, 112 for the time period of the detected maneuver, and compare these features with predetermined training data sets (corresponding to particular types of maneuvers), using the pattern recognition engine 118.

The processing unit 106 may include other components, such as power supply unit 120, input/output (I/O) module 122 to enable communications between the processing unit 106 and other parts of circuitry 104 and peripheral devices, and sensor hub 124, to integrate data provided by sensors 110, 112 and other sensors coupled with the circuitry 104.

The circuitry 104 may further include a charging module 126 to charge a power supply of the apparatus 100 (e.g., a battery), and a communications module 128 to enable near-field communications for the apparatus 100. In embodiments, the charging module 126 may charge the power supply via induction. The communications module 128 may include, for example, Near Field Communication (NFC), Bluetooth®, WiFi, 4G/5G Long-Term Evolution (LTE) capabilities, and so forth.

Other components necessary for functioning of the circuitry 104 may be included, but are not described for brevity. In embodiments, the processing unit 106 may comprise a system on chip (SoC) or system in package (SiP). The processing unit 106, sensors 110, 112, charging module 126, and communications module 128 may comprise a platform 130, and may be disposed in an integrated circuit (IC).

The circuitry 104 may further include an extension module 140 that may be disposed on a printed circuit board (PCB) communicatively coupled with the platform 130. The extension module 140 may include additional sensors, such as global positioning system (GPS) 142, magnetometer 144, altimeter 146, additional memory 148, and transceiver (radio) 158. Memory 148 may be temporal and/or persistent storage of any type, including, but not limited to, volatile and non-volatile memory, optical, magnetic, and/or solid state mass storage, and so forth. The GPS 142 may provide data to the processing unit 106 to indicate a location of the sports equipment 150. The magnetometer 144 may provide data to the processing unit 106 to determine a direction of motion of the sports equipment 150. The altimeter 146 may provide data to the processing unit 106 to indicate an altitude of the sports equipment 150 above a surface. The transceiver 152 may be configured to communicate data related to sports equipment maneuver detection and identification to an external device 160, such as a host computing device. It should be noted that sensors 110, 112, 142, 144, and 146 are shown in FIG. 1 for illustration only and are not limiting the implementation of apparatus 100. It will be appreciated that any number or types of sensors may be used in the apparatus 100. For example, multiple accelerometers and/or gyroscopes may be used to provide a desired quality of motion data.

The apparatus 100 described herein may be used to implement a maneuver classification (identification) for action sports, such as skateboarding using temporal domain samples from the sensors, such as accelerometer 110, gyroscope 112, and other sensors, such as magnetometer 144, for example. Several thresholding metrics may be used to detect a maneuver, such as to determine maneuver events and durations. The maneuver may be identified based on a set of features computed from the temporal domain samples.

FIG. 2 is an example block diagram 200 illustrating detection and identification of a maneuver performed using sports equipment, in accordance with some embodiments. A maneuver performed using sports equipment may be described as a pattern of motion events that occur when the sports equipment is on and/or above the ground (or just above the ground) for a determined period of time. For example, a user of a skateboard may perform a jump and all four wheels of the skateboard may be simultaneously off the ground.

At block 202, motion data, such as 3-axis accelerometer, gyroscope, and magnetometer data may be recorded. In embodiments, the motion data may be recorded at a sampling frequency F, where, for highest classification accuracy, $F \geq 100$ Hz. The motion data may be recorded continuously or periodically, during the motion of the sports equipment.

At block 212, the motion data (temporal sensor) data may be prepared for computation of features to be used for maneuver identification described below. For example, the motion data may be translated (e.g., on a continuous basis) into quaternions using an Altitude-Heading-Reference System (AHRS) algorithm, yielding a referenced position of the sports equipment, with respect to gravity and Earth's magnetic North at each time-stamped value of the data.

The quaternions may be used to compute Euler angles in the sensors' (and thus sport equipment's) reference frame. To avoid or reduce computational errors, the data may be time stamped. The time stamps may be used for all integration periods in the AHRS algorithm. In some embodiments, for example, those pertaining to action sports with dynamic parameters higher than a particular threshold, or having specific dynamic characteristics, such as skateboarding, the parameters of the AHRS algorithm may be set such that the gyroscope measurements may be favored more strongly than the accelerometer measurements. This may provide for accurate (e.g., above a threshold) quantification of events comprising a maneuver. However, an AHRS algorithm with a bias toward gyroscope measurements may not always adequately compensate back to the proper orientation of the sports equipment when the Euler angles become out of sync with the real position of the sports equipment. Because of this, the sports equipment identification (classification) algorithms may be designed to compute features relative to the start of the maneuver and not relative to any absolute orientation. In embodiments, while the Euler angles are utilized for identification (classification) of a detected maneuver, to improve accuracy, they may be computed for each sample in the time series (as each calculation may depend on the previous state of the system). For example, the time series may describe every measurement, in chronological order, taken from the sensors on the sports equipment. The accelerometer and gyroscope provide only acceleration and angular speed, respectively, and therefore may not provide a picture of the absolute orientation of the board in space. By computing the Euler angles at every step in the time series, the accelerometer and gyroscope data may be used to track the absolute position of the sports equipment. The absolute positioning of the sports equipment may be utilized for maneuver classification, and may be computed at every measured data point.

In parallel to preparing data for identification (classification) of the maneuver described in reference to block 212, the motion data may be processed for the detection of the maneuver. For example, the majority of flat-ground skateboarding time may be spent in normal skating motion and not in maneuvers. In other words, a maneuver may occupy a relatively short time period, compared to the total session of use of the sports equipment. A maneuver may be detected when some (or all) of the computed parameters associated with the motion of the sports equipment exceed predetermined thresholds over a time period that may be considered a duration of a maneuver for a particular action sport. Accordingly, detection of a maneuver may include a computation of a plurality of parameters associated with the motion of the sports equipment, and determination of a time period during which at least some of the parameters exceed corresponding thresholds. The time period may comprise duration of the maneuver.

Accordingly, the processing of the motion data for maneuver detection may include identification and extraction of the maneuver regions (e.g., maneuver time periods and corresponding motion data) from the rest of the motion data stream provided at block 202. For example, at block 204, the squared magnitude (e.g., $x^2+y^2+z^2$) of the accelerometer and gyroscope sensor values may be computed at each time stamp. This may effectively compress six dimensional measurements per time stamp (e.g., three rotation-related and three acceleration-related measurements into two rotationally and translationally invariant measurements per time stamp). In other words, it may not matter where in space the sports equipment may be located or in what orientation it may be in relation to Earth when the maneuver takes place. Continuing with the skateboarding example, in embodiments, the invariance of measurements may be provided (because maneuvers in action sports may be performed with the sports equipment starting in a nearly infinite number of orientations). For example, a skateboarder may initiate a maneuver from a position in which the skateboarder balances the board with one or two wheels in contact with the ground. In embodiments, the maneuvers may be flagged regardless of the initial orientation of the sports equipment.

The squared magnitude of the accelerometer readings during periods of normal motion (e.g., skateboard skating), when the wheels of the sports equipment (e.g., a skateboard) are in contact with the ground, may vary considerably based on a surface on which the rider is skating. This may have an appreciable effect on the threshold settings for maneuver detection. To compensate for the effect of a surface on the motion data associated with the sports equipment, a particular period of time (e.g., approximately 5 seconds in the example of a skateboard) may be identified as a start of each motion session, in which ground skating may occur. The squared magnitude of data associated with the motion session may be normalized by the standard deviation of that time period (e.g., 5-second calibration period in the skateboard example). Such calibration may allow for using maneuver detection algorithms regardless of the type of surface on which the motion of the sports equipment may be performed.

At block 206, moving average and moving standard deviation may be computed for each point in the magnitude-calculated data that may be computed every time new sensor data is received, starting from a particular data point (e.g., fifth data point) in the data used to calculate the moving average and standard deviation. For example, the moving average and standard deviation may include the magnitude data from the current motion data (e.g., provided by the accelerometer and gyroscope) and some (e.g., five) magnitude data values from previous time stamped points.

At block 208, the maneuver detection may be performed. For example, when each, or at least some of, mean and/or standard deviations for the magnitude of the accelerometer and gyroscope simultaneously exceed their given thresholds, a maneuver time period (region) may have been detected. The thresholds may be determined and set empirically, for example, by repeated recording of motion data for various maneuvers of particular sports equipment.

Once a maneuver region has been identified, the start and end points of the maneuver may be determined and labeled. For example, from empirical data, the classified skateboarding maneuvers may vary in duration from approximately 0.7 to 1.1 seconds.

At block 210, in order to make sure the entire maneuver is captured, a rolling buffer of time stream data (e.g., 2 seconds for skateboarding) may be continuously collected and buffered. This buffered data may include all axes of sensor data as well as the Euler angles. Once maneuver detection has occurred, an extra portion of data (e.g., 1 second worth of data) may be buffered, in order to ensure that the detection spot is in the middle of the buffered stream. The detection spot may be a first spot where the moving averages and standard deviations may exceed the provided thresholds. Then, an extra portion of data may be buffered so that the detection spot may be in the middle of the buffered data.

The difference of the buffered Euler data may be computed. The difference in the Euler data may be a subtraction between subsequent points in the buffered data. For example, if one Euler axis has corresponding buffer data [321, 322, 323, 325], it may be determined that the sports equipment (e.g., skateboard) may have rotated by [1, 1, 1, 2]

degrees during this time. This provides an estimation of the speed and orientation of the skateboard relative to the Earth or outside observer frame.

Continuing with the skateboard example, maneuver regions may be identified as regions of quick board motion, where the Euler angles may be changing at a determined pace. The first point in the buffer where the difference in the Euler angles exceeds a threshold of a certain value may be labeled as the start of the maneuver. The last point in the buffer where the difference in the Euler angles exceeds the same threshold may be labeled as the end of the maneuver. Continuing with the example described above, the buffered data may be collected in which the detected maneuver-related data is in the middle of the buffered data. In other words, the maneuver-related data is inside the buffered data, but it may not be clear where it "starts" and "ends" in the buffered data in a temporal sense. More specifically, it may be known that the maneuver-related data is inside the buffered data, but not yet known exactly when it begins or ends. For maneuver data detection purposes, the detection point may be moved to the middle of the buffered data as described above, in order to make sure that the whole maneuver-related data is buffered. Accordingly, the buffered data may be searched to identify the spots (e.g., in time) where the buffer data includes rapid (e.g., above a threshold) angle changes (using the computed Euler angles).

At block 214, data in between the start and the end of the maneuver may be converted into various features indicating rotation and acceleration, which may be derived from the range of Euler angles and other statistics (e.g., maximum, minimum, mean, and standard deviation) from the accelerometer and gyroscope.

At block 216, the maneuver identification (classification) may be performed. The maneuver identification may be performed in a number of different ways. For example, the data comprising the features may be run through a pre-fit linear regression model whose coefficients have been pre-determined from training data. In another example, the data may be compared to the training data via pattern matching of the features that may have been preloaded onto the pattern recognition engine. In the latter example, the test features may be compared with all pre-trained maneuver reference features and a type of the maneuver may be identified (e.g., maneuver may be classified) by "nearest neighbor" classification or the influence area of the reference features.

More specifically, the data from the detected maneuver may be compressed into the test features and compared with the reference features from the training set. The reference features may be derived the same way as the test features, but on previously recorded, historic data. In simpler terms, the process of "describing" maneuvers mathematically may have been done numerous times. These descriptions (e.g., reference features) may be loaded for the pattern matcher as the training data. When a maneuver is detected in real or near-real time, the features of the detected maneuver may be computed and compared to the stored features. "Nearest neighbor" may classify the maneuver based on what trained data is closest to the test data (e.g., matches the test data within a determined margin).

Influence area may allow training data to have a larger zone for "closeness" of matching. For example, if a particular maneuver shows more style variations among riders than another, then it may be given a larger "closeness" zone in the matching criteria.

In each of these cases, the normal Euclidian distance (L1 distance) from the best fit data set may be computed, and identified maneuvers above a certain threshold distance may be eliminated as false detection. In other words, if the distance is too far from the closest best fit data set (e.g., data set with the best match to the training data), then the data set may be rejected as a misclassification. The testing of the skateboarding data has shown that classification algorithms described above may perform at greater than 94% accuracy using ten different maneuvers and 48 feature nodes in the pattern recognition engine.

The training data sets to load into the pattern recognition engine may be acquired empirically. For the skateboard example, in embodiments, the training data sets were collected using seven different skateboard riders, each of whom performed the training maneuvers 10-20 times in succession. Overall, over 300 maneuvers were used for training the data set. The data was collected at both 400 and 100 Hz, and all 400 Hz data was down sampled to 100 Hz by utilizing every 4th data point. This created four time streams for each 400 Hz data set.

The time streams were processed as described above, extracting the 12 features for each identified maneuver. Since the maneuver labels were known, the feature sets derived from each maneuver were compared for self-similarity using the L1 distance. Any maneuvers above a certain distance threshold in the comparison were eliminated from the training set, flagged as false detection or an unsuccessful maneuver attempt.

Figure 3:
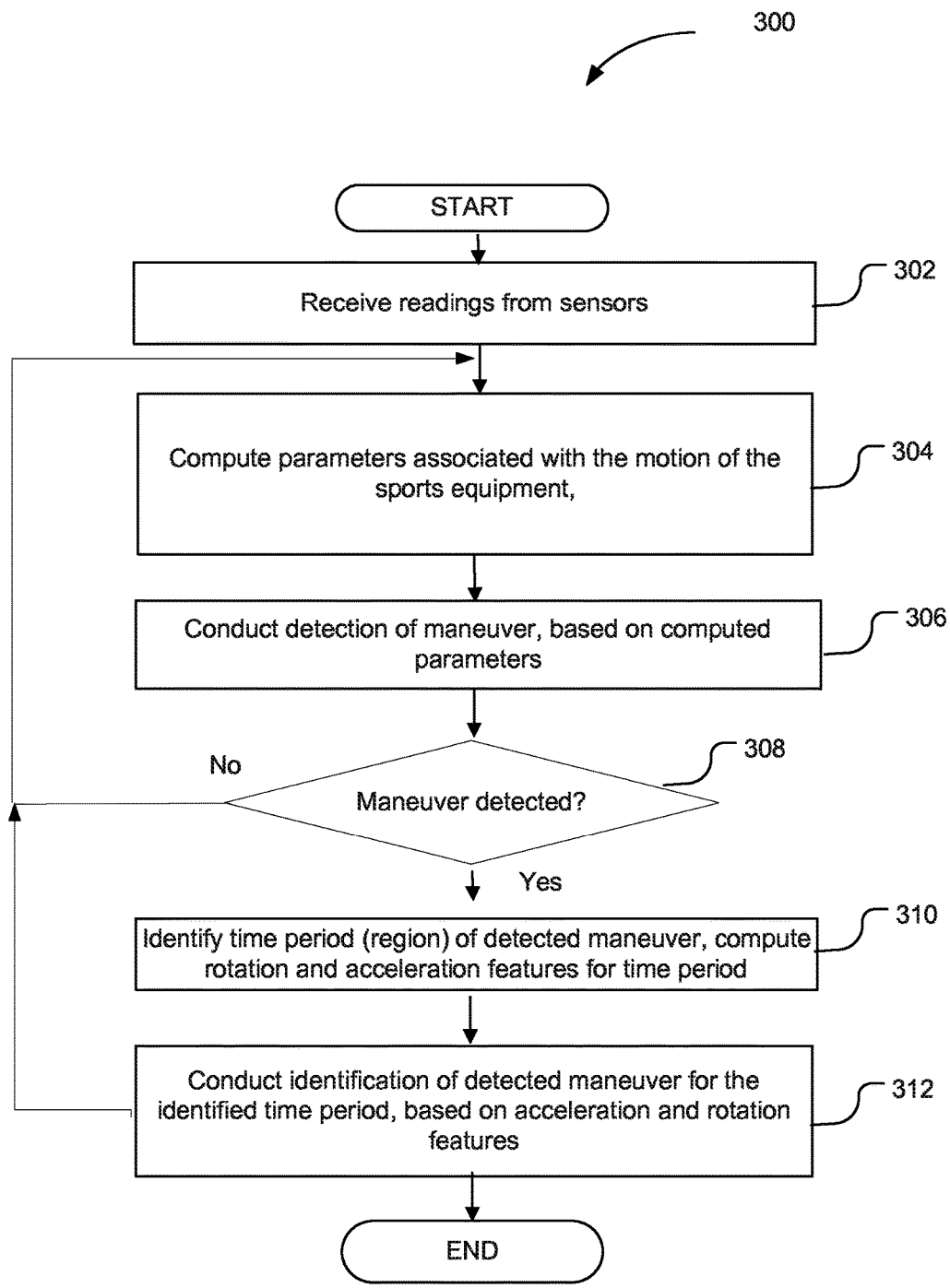
FIG. 3 is a process flow diagram for detecting and identifying a maneuver performed using sports equipment, in accordance with some embodiments.

FIG. 3 is a process flow diagram for detecting and identifying a maneuver performed using sports equipment, in accordance with some embodiments. The process 300 may comport with some of the embodiments described in reference to FIGS. 1-2. In alternate embodiments, the process 300 may be practiced with more or fewer operations, or a different order of the operations. The process may be performed by the apparatus 100 of FIG. 1, for example.

The process 300 may begin at block 302 and include receiving readings from sensors, such as the accelerometer and gyroscope coupled with (e.g., embedded in) the circuitry of the apparatus 100. The sensor readings may be received on a continuous or periodic basis.

At block 304, the process 300 may include computing parameters associated with the motion of the sports equipment, as described in reference to blocks 204 and 206 of FIG. 2. In parallel, the process 300 may include computing parameters to be used for computation of rotation and acceleration features from the motion data, as described in reference to block 212 of FIG. 2. The processed parameters may be buffered for a period of time, as described in block 210 of FIG. 2.

At block 306, the process 300 may include conducting detection of a maneuver, based on the computed parameters, as described in reference to block 208 of FIG. 2.

At decision block 308, the process 300 may include determining whether a maneuver has been detected, e.g., whether some or all of the parameters computed as described in reference to blocks 204 and 206 exceed their corresponding predetermined thresholds.

If the maneuver has been detected, at block 310 a temporal region of a maneuver in the data provided by the sensors may be identified, such as the time period within which the maneuver took place, e.g., a time period within which the parameters exceed their corresponding thresholds. The process may further include computing acceleration and rotation features for the determined time period, for further maneuver classification (identification), as described in reference to block 214 of FIG. 2. If a maneuver has not been detected, the process 300 may revert to block 304.

At block 312, the process 300 may include conducting identification of detected maneuver for the identified time period, based on the computed acceleration and rotation features, as described in reference to block 216 of FIG. 2. For example, the features may be compared with predetermined training data sets using the pattern recognition engine, in order to identify a type of the detected maneuver.

Figure 4:
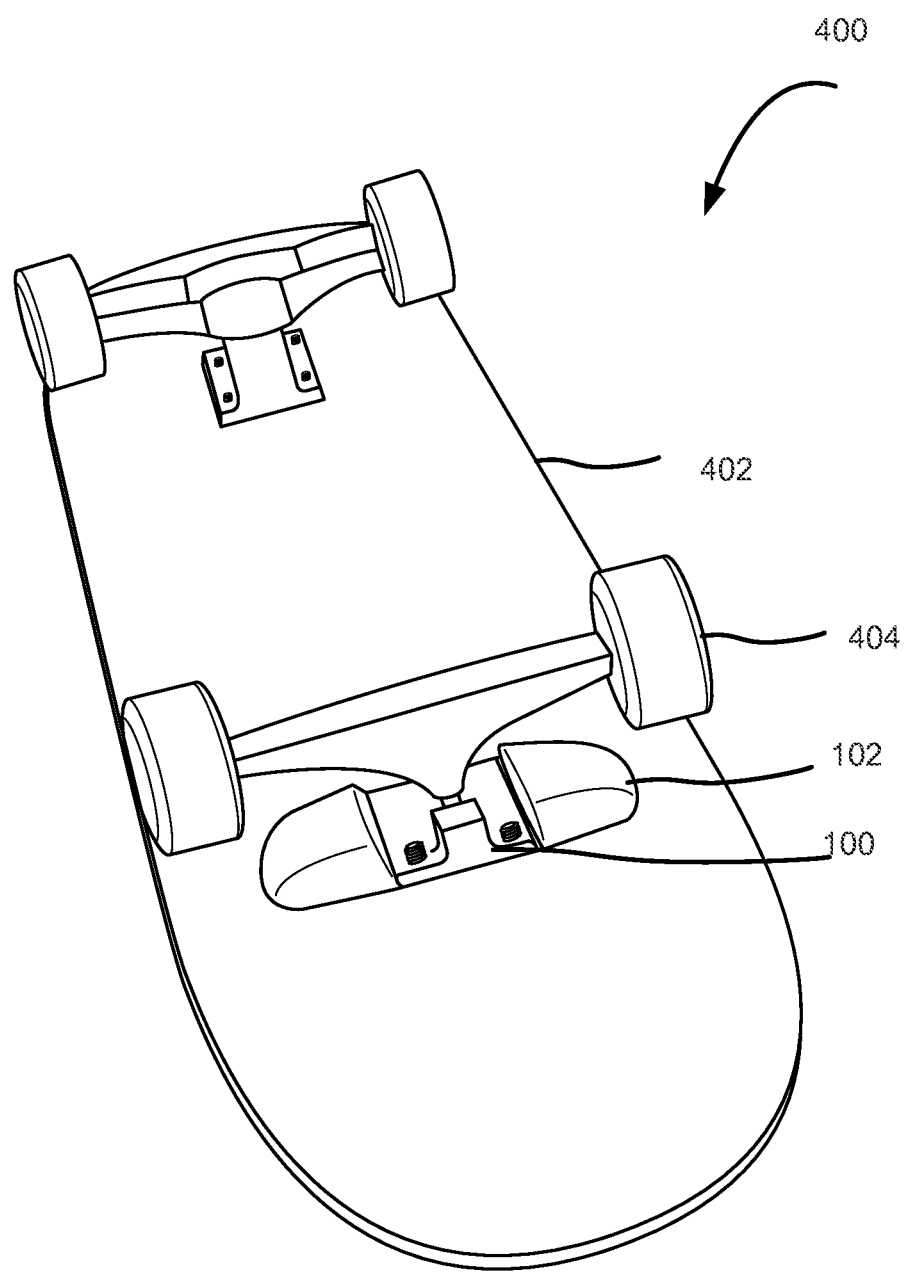
FIG. 4 illustrates an example sports equipment with the apparatus of FIG. 1 attached, in accordance with some embodiments.

FIG. 4 illustrates an example sports equipment with the apparatus of FIG. 1 attached, in accordance with some embodiments. As shown, sports equipment may be a skateboard 400, in accordance with examples described in reference to FIG. 2. The apparatus 100 may be mounted, with the housing 102, to the back side of the skate platform 402. For the user's convenience, the apparatus 100 may be mounted underneath the trucks 404 as shown, although different placements of the apparatus on the skateboard 400 may be possible.

Example 1 is an apparatus for identifying a maneuver of sports equipment, comprising: a housing to be attached to the sports equipment, wherein the sports equipment is to be used to conduct a motion; two or more sensors disposed on or in the housing to sense acceleration or rotation of the sports equipment during the motion, and to output motion data associated with the acceleration or rotation of the sports equipment; and circuitry disposed in the housing and coupled to the sensors to receive the motion data and to identify a maneuver performed using the sports equipment, based on the motion data.

Example 2 may include the subject matter of Example 1, wherein the circuitry is to detect the maneuver, wherein to detect the maneuver includes to: compute a plurality of parameters associated with the motion of the sports equipment; and determine a time period during which at least some of the parameters exceed corresponding thresholds, wherein the time period substantially comprises a duration of the maneuver.

Example 3 may include the subject matter of Example 2, wherein to compute a plurality of parameters includes to compute squared magnitudes of some of the motion data outputted by the two or more sensors at each time stamp during the motion of the sports equipment, and calibrate the computed squared magnitudes of the motion data; and wherein to determine a time period during which at least some of the parameters exceed corresponding thresholds includes to compare each of the calibrated motion data with the corresponding thresholds.

Example 4 may include the subject matter of Example 2, wherein the sports equipment is to be used to conduct a motion on or above a surface, wherein to detect the maneuver further includes to determine that the sports equipment is used to perform the maneuver above the surface over the time period.

Example 5 may include the subject matter of Example 2, wherein the circuitry further includes a processor and a pattern recognition engine operated by the processor, wherein to identify the maneuver includes to compute one or more rotation and acceleration features from the motion data provided by the two or more sensors for the determined time period of the detected maneuver, and compare the features with one or more predetermined training data sets using the pattern recognition engine.

Example 6 may include the subject matter of Example 5, wherein each of the one or more predetermined training data sets corresponds to a combination of acceleration and rotation of the sports equipment that defines a type of a maneuver.

Example 7 may include the subject matter of Example 5, wherein the circuitry further includes a transceiver to provide data associated with the identified maneuver to an external device.

Example 8 may include the subject matter of Example 1, wherein the two or more sensors include an accelerometer and a gyroscope, wherein the circuitry further includes: a magnetometer, to provide data indicating a direction of the motion of the sports equipment; an altimeter to provide data to indicate an altitude of the sports equipment above a surface; and a global positioning system (GPS) to provide data to indicate a location of the equipment.

Example 9 may include the subject matter of Example 8, wherein the circuitry is disposed at least in part in an integrated circuit (IC), wherein the IC is disposed inside the housing.

Example 10 may include the subject matter of any of Examples 1 to 9, wherein the sports equipment comprises recreational equipment associated with action sports and includes at least one of: a skateboard, a surfboard, a snowboard, or a ski.

Example 11 is an integrated circuit, comprising: circuitry to receive motion data from two or more sensors coupled with the circuitry and disposed on sports equipment, during a motion of the sports equipment; and detect and identify a maneuver performed using the sports equipment during the motion of the sports equipment, based on the motion data.

Example 12 may include the subject matter of Example 11, wherein to detect the maneuver includes to: compute a plurality of parameters associated with the motion of the sports equipment; and determine a time period during which at least some of the parameters exceed corresponding thresholds, wherein the time period substantially comprises a duration of the maneuver.

Example 13 may include the subject matter of Example 12, wherein to compute a plurality of parameters includes to compute squared magnitudes of some of the motion data outputted by the two or more sensors at each time stamp during the motion of the sports equipment, and calibrate the computed squared magnitudes of the motion data; and wherein to determine a time period during which at least some of the parameters exceed corresponding thresholds includes to compare each of the calibrated motion data with the corresponding thresholds.

Example 14 may include the subject matter of Example 12, wherein the circuitry further includes a processor and a pattern recognition engine operated by the processor, wherein to identify the maneuver includes to compute one or more rotation and acceleration features from the motion data provided by the two or more sensors for the determined time period of the detected maneuver, and compare the features with one or more predetermined training data sets using the pattern recognition engine, wherein each of the one or more predetermined training data sets corresponds to a combination of acceleration and rotation of the sports equipment that defines a type of a maneuver.

Example 15 may include the subject matter of any of Examples 12 to 14, wherein the circuitry is further disposed on a printed circuit board (PCB) communicatively coupled with the IC, wherein the integrated circuit and the PCB are disposed in a housing, wherein the housing is to be attached to the sports equipment.

Example 16 is a method for identifying a maneuver performed using sports equipment, comprising: receiving, by an apparatus coupled with the sports equipment, motion data associated with acceleration or rotation of the sports equipment during a motion, from two or more sensors disposed on the sports equipment; and detecting and identifying, by the apparatus, a maneuver performed using the sports equipment during the motion, based on the motion data.

Example 17 may include the subject matter of Example 16, wherein detecting the maneuver includes: computing, by the apparatus, a plurality of parameters associated with the motion of the sports equipment; and determining, by the apparatus, a time period during which at least some of the parameters exceed corresponding thresholds, wherein the time period substantially comprises a duration of the maneuver.

Example 18 may include the subject matter of Example 17, wherein computing a plurality of parameters further includes: computing, by the apparatus, squared magnitudes of some of the motion data outputted by the two or more sensors at each time stamp during the motion of the sports equipment; and calibrating, by the apparatus, the computed squared magnitudes of the motion data; and wherein determining a time period during which at least some of the parameters exceed corresponding thresholds includes comparing, by the apparatus, each of the calibrated motion data with the corresponding thresholds.

Example 19 may include the subject matter of Example 17, wherein identifying the maneuver includes: computing, by the apparatus, one or more rotation and acceleration features from the motion data provided by the two or more sensors for the determined time period of the detected maneuver; and comparing, by the apparatus, the features with one or more predetermined training data sets, to determine a match between the features and one of the training data sets, wherein each of the one or more predetermined training data sets corresponds to a combination of acceleration and rotation of the sports equipment that defines a type of a maneuver.

Example 20 may include the subject matter of any of Examples 16 to 19, further comprising: providing, by the apparatus, information indicating the detected and identified maneuver to an external device.

Example 21 is an apparatus for identifying a maneuver performed using sports equipment, comprising: means for receiving motion data associated with acceleration or rotation of the sports equipment during a motion, from two or more sensors disposed on the sports equipment; and means for detecting and identifying a maneuver performed using the sports equipment during the motion, based on the motion data.

Example 22 may include the subject matter of Example 21, wherein the means for detecting includes: means for computing a plurality of parameters associated with the motion of the sports equipment; and means for determining a time period during which at least some of the parameters exceed corresponding thresholds, wherein the time period substantially comprises a duration of the maneuver.

Example 23 may include the subject matter of Example 21, further comprising: means for providing information indicating the detected and identified maneuver to an external device.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for identifying a maneuver of sports equipment, comprising:
    a housing to be attached to the sports equipment, wherein the sports equipment is to be used to conduct a motion;
    two or more sensors disposed on or in the housing to sense acceleration or rotation of the sports equipment during the motion, and to output motion data associated with the acceleration or rotation of the sports equipment; and
    circuitry disposed in the housing and coupled to the sensors to receive the motion data, detect the maneuver performed using the sports equipment, and identify the maneuver, based on the motion data, which includes:
    compute one or more angle features in a sports equipment reference frame, wherein the angle features are to be used in the maneuver identification; and
    in parallel with the computation of the one or more angle features,
    detect the maneuver, which includes to identify a detection spot in the motion data, based at least in part on the computed angle features, wherein the detection spot includes a starting point of the maneuver; and
    buffer a portion of the motion data that includes the detection spot, wherein the detection spot is approximately in the middle of the portion of the motion data, wherein the buffered portion of the motion data includes a data associated with the maneuver, wherein the portion of the motion data is to be used in the identification of the maneuver.

2. The apparatus of claim 1, wherein to detect the maneuver further includes to:
    compute a plurality of parameters associated with the motion of the sports equipment; and
    determine a time period during which at least some of the parameters exceed corresponding thresholds, wherein the time period substantially comprises a duration of the maneuver.

3. The apparatus of claim 2, wherein to compute a plurality of parameters includes to compute squared magnitudes of some of the motion data outputted by the two or more sensors at each time stamp during the motion of the sports equipment, and calibrate the computed squared magnitudes of the motion data; and
    wherein to determine a time period during which at least some of the parameters exceed corresponding thresholds includes to compare each of the calibrated motion data with the corresponding thresholds.

4. The apparatus of claim 2, wherein the sports equipment is to be used to conduct a motion on or above a surface, wherein to detect the maneuver further includes to determine that the sports equipment is used to perform the maneuver above the surface over the time period.

5. The apparatus of claim 2, wherein the circuitry further includes a processor and a pattern recognition engine operated by the processor, wherein to identify the maneuver includes to compute one or more rotation and acceleration features from the motion data provided by the two or more sensors for the determined time period of the detected maneuver, and compare the features with one or more predetermined training data sets using the pattern recognition engine.

6. The apparatus of claim 5, wherein each of the one or more predetermined training data sets corresponds to a combination of acceleration and rotation of the sports equipment that defines a type of a maneuver.

7. The apparatus of claim 5, wherein the circuitry further includes a transceiver to provide data associated with the identified maneuver to an external device.

8. The apparatus of claim 1, wherein the two or more sensors include an accelerometer and a gyroscope, wherein the circuitry further includes:
  a magnetometer, to provide data indicating a direction of the motion of the sports equipment;
  an altimeter to provide data to indicate an altitude of the sports equipment above a surface; and
  a global positioning system (GPS) to provide data to indicate a location of the equipment.

9. The apparatus of claim 8, wherein the circuitry is disposed at least in part in an integrated circuit (IC), wherein the IC is disposed inside the housing.

10. The apparatus of claim 1, wherein the sports equipment comprises recreational equipment associated with action sports and includes at least one of: a skateboard, a surfboard, a snowboard, or a ski.

11. An integrated circuit, comprising:
  circuitry to receive motion data from two or more sensors coupled with the circuitry and disposed on sports equipment, during a motion of the sports equipment; and detect and identify a maneuver performed using the sports equipment during the motion of the sports equipment, based on the motion data, wherein to detect and identify the maneuver includes:
  compute one or more angle features in a sports equipment reference frame, to use Euler angles in the maneuver identification; and
  in parallel with the computation of the one or more angle features,
  detect the maneuver, which includes to identify a detection spot in the motion data, based at least in part on the computed angle features, wherein the detection spot includes a starting point of the maneuver; and
  buffer a portion of the motion data that includes the detection spot, wherein the detection spot is approximately in the middle of the portion of the motion data, wherein the buffered portion of the motion data includes a data associated with the maneuver, wherein the portion of the motion data is to be used in the identification of the maneuver.

12. The integrated circuit of claim 11, wherein to detect the maneuver further includes to:
  compute a plurality of parameters associated with the motion of the sports equipment; and
  determine a time period during which at least some of the parameters exceed corresponding thresholds, wherein the time period substantially comprises a duration of the maneuver.

13. The integrated circuit of claim 12, wherein to compute a plurality of parameters includes to compute squared magnitudes of some of the motion data outputted by the two or more sensors at each time stamp during the motion of the sports equipment, and calibrate the computed squared magnitudes of the motion data; and
  wherein to determine a time period during which at least some of the parameters exceed corresponding thresholds includes to compare each of the calibrated motion data with the corresponding thresholds.

14. The integrated circuit of claim 12, wherein the circuitry further includes a processor and a pattern recognition engine operated by the processor, wherein to identify the maneuver includes to compute one or more rotation and acceleration features from the motion data provided by the two or more sensors for the determined time period of the detected maneuver, and compare the features with one or more predetermined training data sets using the pattern recognition engine,
  wherein each of the one or more predetermined training data sets corresponds to a combination of acceleration and rotation of the sports equipment that defines a type of a maneuver.

15. The integrated circuit of claim 12, wherein the circuitry is further disposed on a printed circuit board (PCB) communicatively coupled with the integrated circuit, wherein the integrated circuit and the PCB are disposed in a housing, wherein the housing is to be attached to the sports equipment.

16. A method for identifying a maneuver performed using sports equipment, comprising:
  receiving, by an apparatus coupled with the sports equipment, motion data associated with acceleration or rotation of the sports equipment during a motion, from two or more sensors disposed on the sports equipment; and
  detecting and identifying, by the apparatus, the maneuver performed using the sports equipment during the motion, based on the motion data, including:
  computing one or more angle features in a sports equipment reference frame, wherein the angle features are to be used in the maneuver identification; and
  in parallel with computing the one or more angle features,
  detecting the maneuver, which includes identifying a detection spot in the motion data, based at least in part on the computed angle features, wherein the detection spot includes a starting point of the maneuver; and
  buffering a portion of the motion data that includes the detection spot, wherein the detection spot is approximately in the middle of the portion of the motion data, wherein the buffered portion of the motion data includes a data associated with the maneuver, wherein the portion of the motion data is to be used in the identifying the maneuver.

17. The method of claim 16, wherein detecting the maneuver further includes:
  computing, by the apparatus, a plurality of parameters associated with the motion of the sports equipment; and
  determining, by the apparatus, a time period during which at least some of the parameters exceed corresponding thresholds, wherein the time period substantially comprises a duration of the maneuver.

18. The method of claim 17, wherein computing a plurality of parameters further includes:
  computing, by the apparatus, squared magnitudes of some of the motion data outputted by the two or more sensors at each time stamp during the motion of the sports equipment; and
  calibrating, by the apparatus, the computed squared magnitudes of the motion data; and
  wherein determining a time period during which at least some of the parameters exceed corresponding thresholds includes comparing, by the apparatus, each of the calibrated motion data with the corresponding thresholds.

19. The method of claim 17, wherein identifying the maneuver includes:
- computing, by the apparatus, one or more rotation and acceleration features from the motion data provided by the two or more sensors for the determined time period of the detected maneuver; and
- comparing, by the apparatus, the features with one or more predetermined training data sets, to determine a match between the features and one of the training data sets, wherein each of the one or more predetermined training data sets corresponds to a combination of acceleration and rotation of the sports equipment that defines a type of a maneuver.

20. The method of claim 16, further comprising:
providing, by the apparatus, information indicating the detected and identified maneuver to an external device.

* * * * *